United States Patent
Hashimoto

(10) Patent No.: US 9,245,563 B2
(45) Date of Patent: Jan. 26, 2016

(54) MAGNETIC MEDIUM WITH AN ORIENTATION CONTROL LAYER

(75) Inventor: Atsushi Hashimoto, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 79 days.

(21) Appl. No.: 14/114,641

(22) PCT Filed: May 14, 2012

(86) PCT No.: PCT/JP2012/062277
§ 371 (c)(1),
(2), (4) Date: Oct. 29, 2013

(87) PCT Pub. No.: WO2012/157600
PCT Pub. Date: Nov. 22, 2012

(65) Prior Publication Data
US 2014/0063656 A1  Mar. 6, 2014

(30) Foreign Application Priority Data
May 17, 2011 (JP) .................. 2011-110354

(51) Int. Cl.
*G11B 5/74* (2006.01)
*G11B 23/00* (2006.01)
*G11B 5/667* (2006.01)
*G11B 5/73* (2006.01)

(52) U.S. Cl.
CPC ............. *G11B 5/667* (2013.01); *G11B 5/732* (2013.01); *Y10T 156/10* (2015.01)

(58) Field of Classification Search
CPC .......... G11B 5/82; G11B 5/667; G11B 5/732; Y10T 156/10
USPC ................ 360/131, 135; 428/826–832.4
See application file for complete search history.

(56) References Cited

U.S. PATENT DOCUMENTS 6,174,582 B1 * 1/2001 Bian et al. ................ 428/831.2
6,541,131 B1 * 4/2003 Ristau ...................... 428/826
(Continued)

FOREIGN PATENT DOCUMENTS

JP  2002-237026 A  8/2002
JP  2004-134041 A  4/2004
(Continued)

OTHER PUBLICATIONS

International Search Report of PCT/JP2012/062277 dated Jul. 31, 2012.

*Primary Examiner* — Gustavo Polo
(74) *Attorney, Agent, or Firm* — Sughrue Mion, PLLC

(57) ABSTRACT

Provided is a magnetic recording medium which maintains high vertical orientation of a vertical magnetic layer, and which is capable of realizing high recording densification. In the magnetic recording medium, at least a soft magnetic underlying layer (30), seed layers (31, 32), an orientation control layer (33), and a vertical magnetic layer are laminated in this order on the non-magnetic substrate. The soft magnetic underlying layer (30) has an amorphous or microcrystalline structure. The seed layers (31, 32) include a first seed layer (31) formed from a metal oxide or a metal nitride, and a second seed layer (32) which is formed on the first seed layer and is formed from a metal formed with an island-shape or a net shape. In the orientation control layer (33) and the vertical magnetic layer, respective crystal grains constitute columnar crystals that are continuous in a thickness direction based on the second seed layer (32).

8 Claims, 4 Drawing Sheets

(56) References Cited

U.S. PATENT DOCUMENTS

2002/0122959 A1* 9/2002 Matsunuma et al. ... 428/694 TS
2009/0296278 A1* 12/2009 Inamura et al. ............... 360/135

FOREIGN PATENT DOCUMENTS

| | | |
|---|---|---|
| JP | 2004-145946 A | 5/2004 |
| JP | 2004-272997 A | 9/2004 |
| JP | 2004-310910 A | 11/2004 |
| JP | 2005-071525 A | 3/2005 |
| JP | 2005-108347 A | 4/2005 |
| JP | 2005-276410 A | 10/2005 |
| JP | 2006-331582 A | 12/2006 |
| JP | 2007-179598 A | 7/2007 |
| JP | 2007-272990 A | 10/2007 |
| JP | 2008-204539 A | 9/2008 |
| JP | 2009-116952 A | 5/2009 |

* cited by examiner

MAGNETIC MEDIUM WITH AN ORIENTATION CONTROL LAYER

CROSS REFERENCE TO RELATED APPLICATIONS

This is a National Stage of International Application No. PCT/JP2012/062277 filed May 14, 2012, claiming priority based on Japanese Patent Application No. 2011-110354 filed May 17, 2011, the contents of all of which are incorporated herein by reference in their entirety.

Technical Field

The invention relates to a magnetic recording medium, a method of manufacturing the same, and a magnetic recording and reproducing device.

BACKGROUND ART

A hard disk drive (HDD) that is a type of a magnetic recording and reproducing device is currently increased in recording density at a rate of 50% or more a year, and it is said that this trend will continue in the future. According to this trend, development of a magnetic head and a magnetic recording medium which are suitable for high recording densification is in progress.

At present, a magnetic recording medium that is mounted on a commercially available magnetic recording and reproducing device is a so-called vertical magnetic recording medium in which the axis of easy magnetization in a magnetic film is primary oriented vertically. A vertical magnetic recording medium is reduced in the influence of a diamagnetic field at a boundary region between recording bits even with high recording densification, and therefore, a clear bit boundary is formed. Accordingly, an increase in noise is suppressed. Furthermore, a reduction in recording bit volume along with high recording densification is small, the vertical magnetic recording medium is also resistant to the heat fluctuation effect. In light of this, recently, a magnetic recording medium has attracted attention, and there is proposed a structure for a medium suitable for the vertical magnetic recording.

In addition, recent studies have been directed to the use of a single-pole head having high ability for writing to the vertical magnetic layer so as to cope with a demand for high recording densification of a magnetic recording medium. To correspond to such a single-pole head, there is suggested a magnetic recording medium in which a layer, which is called a backing layer and is formed from a soft magnetic material, is provided between a vertical magnetic layer that is a recording layer and a non-magnetic substrate so as to improve magnetic flux entry and exit efficiency between the single-pole head and the magnetic recording medium.

However, in a magnetic recording and reproducing device using a magnetic recording medium in which the above-described backing layer is simply provided, recording and reproducing characteristics, heat fluctuation resistance, or magnetic resolution during recording and reproduction may not be satisfactory, and thus a magnetic recording medium excellent in these characteristics is desired.

Particularly, a high S/N ratio in which the ratio of reproduced signal to noise (S/N ratio) is increased, and improvement in heat fluctuation resistance are important as recording and reproducing characteristics; and in the future, these two items will be necessary for high recording densification. However, these two items are in a trade-off relationship, and thus when one of these items is improved, the other is degraded, and thus achieving a high level of both these items is a primary problem.

To solve the problem, there is suggested a magnetic recording medium in which three magnetic layers are joined by AFC (Anti Ferro Coupling) using a non-magnetic layer or the like, and thus a decrease in the S/N ratio is not caused while enjoying an advantage of a decrease in synthetic Mrt and PW50 (for example, refer to Patent Document 1).

Specifically, Patent Document 1 discloses a magnetic recording medium provided with a substrate, a first lower ferromagnetic layer which is disposed on the substrate and has a residual magnetization Mr, a thickness t, and a product Mrt of a residual magnetization and thickness, a ferromagnetic coupling layer disposed on the first lower ferromagnetic layer, a second lower ferromagnetic layer which is disposed on the ferromagnetic coupling layer and has an Mrt value, an antiferromagnetic coupling layer disposed on the second lower ferromagnetic layer, and an upper ferromagnetic layer which is disposed on the antiferromagnetic coupling layer, and which has an Mrt value larger than the sum of the Mrt values of the first and second lower ferromagnetic layers.

On the other hand, to improve the recording and reproducing characteristics and the heat fluctuation characteristics of the vertical magnetic recording medium, there is suggested a technology in which multi-layered magnetic layers are formed using an orientation control layer, and crystal grains of the respective magnetic layers are made into continuous columnar crystals, thereby increasing the vertical orientation of the magnetic layers (for example, refer to Patent Document 2).

In addition, there is disclosed a technology in which as an orientation control layer, for example, Ru is used. Ru has a dome-shaped convex portion at an apex portion of the columnar crystals. Accordingly, Ru has an effect in that crystal grains of the magnetic layer or the like are allowed to grow on the convex portion, a separation structure of the grown crystal grains is promoted, the crystal grains are isolated, and magnetic particles are grown in a columnar shape (for example, refer to Patent Document 3).

In addition, there is suggested a technology in which a NiW alloy layer as a seed layer is provided between a soft magnetic layer and an orientation control layer for refinement of the columnar crystal that constitutes the orientation control layer (For example, refer to Patent Document 4).

In addition, there is suggested a magnetic recording medium having a structure in which a soft magnetic layer, an intermediate layer, a vertical recording layer, and a protective layer are provided on a substrate. In the magnetic recording medium, from a side close to a substrate, a first intermediate layer is a metal layer containing at least one kind of element selected from a group consisting of Pd, Pt, Au, Ag, Rh, Ru, and Ti as a main component, a second intermediate layer is an oxygen-containing layer, a third intermediate layer is a metal layer containing at least one kind of element selected from a group consisting of Pd, Pt, Au, Ag, Rh, Ru, and Ti as a main component, a fourth intermediate layer is a metal layer containing at least one kind of element selected from Co, Cr, Ru, and Ti as a main component, and the vertical recording layer contains Co as a main component and also contains oxygen (for example, refer to Patent Document 5).

In addition, paragraphs [0010] to [0011] of Patent Document 5 disclose that oxygen is allowed to be contained in a recording layer using a four-layered intermediate layer. In the four-layered intermediate layer, vertical orientation is controlled by the first intermediate layer, an island-shaped isolated structure (convex structure) is formed in the oxygen-containing layer that is the second intermediate layer, and the metal layer that is the third intermediate layer, the fourth intermediate layer having a hexagonal close packing structure is further formed using the convex portion as a nucleus. According to this, a coercive force and a squareness ratio of the recording layer are improved, a media-noise is reduced, and heat-resistant demagnetization characteristics are improved.

CITATION LIST

Patent Document

[Patent Document 1] Japanese Unexamined Patent Application, First Publication No. 2005-276410
[Patent Document 2] Japanese Unexamined Patent Application, First Publication No. 2004-310910
[Patent Document 3] Japanese Unexamined Patent Application, First Publication No. 2007-272990
[Patent Document 4] Japanese Unexamined Patent Application, First Publication No. 2007-179598
[Patent Document 5] Japanese Unexamined Patent Application, First Publication No. 2004-134041

SUMMARY OF INVENTION

Technical Problem

However, the demand for high recording densification with respect to the magnetic recording medium is increasing, and a greater improvement in characteristics has been demanded for the magnetic recording medium than ever before. Specifically, in order to increase the recording density of the magnetic recording medium, it is necessary to increase the fineness of the crystals which form the orientation control layer, in order to increase the fineness of the magnetic particles which are formed on the orientation control layer and which have a columnar structure.

In addition, in the invention disclosed in Patent Document 5, formation of the soft magnetic layer or the first intermediate layer is accompanied by a heat treatment at a high temperature (refer to a paragraph [0022]), and thus it can be understood that crystallization of the layer or enlargement of crystal grains is apt to progress, and thus refinement of the magnetic powders is obstructed.

The invention has been made in consideration of such circumstances of the related art, and an object thereof is to provide a magnetic recording medium in which high vertical orientation of a vertical magnetic layer is maintained, and high recording densification is realized, a method of manufacturing the same, and a magnetic recording and reproducing device provided with the magnetic recording medium.

Solution to Problem

The present inventors have made a thorough investigation to solve the above-described problems. As a result, they have obtained the following finding. In a case where a first seed layer formed from a metal oxide or a metal nitride which has small surface energy is formed on a soft magnetic underlying layer having an amorphous or microcrystalline structure, and a second seed layer, which is formed from a metal having a relatively low melting point and having an fcc structure or an hcp structure in which surface energy is relatively large, is formed on the first seed layer, when nuclei at an early stage of growth occur at the second seed layer, the nuclei are not affected by crystal grains which constitute the soft magnetic underlying layer or the first seed layer, and crystal grains which constitute the second seed layer become fine and uniform. In addition, the present inventors have found that columnar crystals of respective layers, which are crystal-grown continuously in a thickness direction based on the second seed layer until reaching the uppermost layer of a vertical magnetic layer from an orientation control layer, may be constituted by crystal grains having a fine and uniform grain size, and they produced the current invention.

That is, the invention provides the following means.

(1) According to an aspect of the invention, there is provided a magnetic recording medium having at least a configuration in which a soft magnetic underlying layer, a seed layer, an orientation control layer, and a vertical magnetic layer are laminated on a non-magnetic substrate in this order.

The soft magnetic underlying layer has an amorphous or microcrystalline structure.

The seed layer includes a first seed layer formed from a metal oxide or a metal nitride, and a second seed layer which is formed on the first seed layer and is formed from a metal formed with an island-shape or a net shape.

In the orientation control layer and the vertical magnetic layer, respective crystal grains constitute columnar crystals that are continuous in a thickness direction based on the second seed layer.

(2) In the magnetic recording medium according to (1), the first seed layer may contain any one kind selected from a group consisting of CrN, TiN, AlN, ZnO, TiO, and MgO.

(3) In the magnetic recording medium according to (2), the first seed layer may contain ZnO or AlN.

(4) In the magnetic recording medium according to any one of (1) to (3), the film thickness of the first seed layer may be within a range of 0.4 nm to 10 nm.

(5) In the magnetic recording medium according to any one of (1) to (4), the second seed layer may contain any one kind selected from a group consisting of Cu, Au, and Ag.

(6) In the magnetic recording medium according to (5), the second seed layer may contain Au or Ag.

(7) In the magnetic recording medium according to any one of (1) to (6), the orientation control layer may contain any one kind selected from a group consisting of Ru, a Ru alloy, and a CoCr alloy.

(8) In the magnetic recording medium according to (7), the orientation control layer may contain Ru.

(9) According to another aspect of the invention, there is provided a method of manufacturing a magnetic recording medium having at least a configuration in which a soft magnetic underlying layer, a seed layer, an orientation control layer, and a vertical magnetic layer are laminated on a non-magnetic substrate in this order.

The soft magnetic underlying layer is made to have an amorphous or microcrystalline structure.

The seed layer is made to have a structure that includes a first seed layer formed from a metal oxide or a metal nitride, and a second seed layer which is formed on the first seed layer and is formed from a metal formed with an island-shape or a net shape.

The respective layers are subjected to crystal growth in such a manner that crystal grains constituting the orientation control layer and the vertical magnetic layer form columnar crystals that are continuous in a thickness direction based on the second seed layer.

(10) According to still another aspect of the invention, there is provided a magnetic recording and reproducing device including the magnetic recording medium according to any one of (1) to (8), or the magnetic recording medium that is manufactured by the manufacturing method according to (9), and a magnetic head that performs recording and reproduction of information with respect to the magnetic recording medium.

Advantageous Effects of Invention

As described above, in the invention, the columnar crystals of respective layers, which are crystal-grown continuously in a thickness direction based on the second seed layer until reaching the uppermost layer of a vertical magnetic layer from the orientation control layer, may be constituted by crystal grains having a fine and uniform grain size. Accordingly, it is possible to provide a magnetic recording medium in which high vertical orientation of a vertical magnetic layer is maintained, and high recording densification is realized, a method of manufacturing the same, and a magnetic recording and reproducing device provided with the magnetic recording medium.

DESCRIPTION OF EMBODIMENTS

Figure 1:
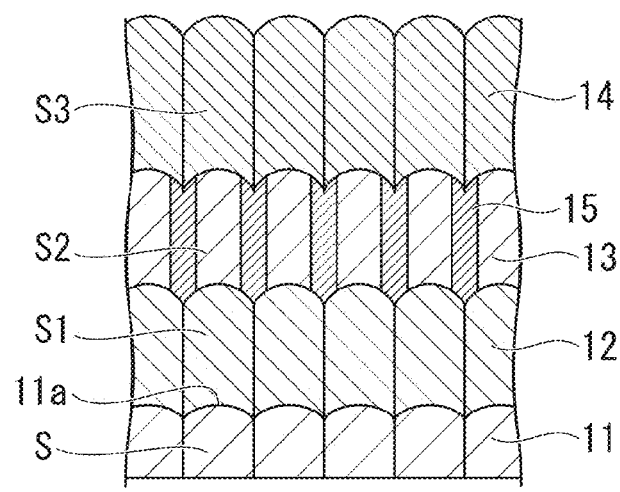
FIG. 1 is a cross-sectional diagram illustrating a state in which columnar crystals of respective layers are grown vertically with respect to a substrate surface.

Hereinafter, a magnetic recording medium and a magnetic recording and reproducing device to which the invention is applied will be described in detail with reference to the attached drawings. In addition, in the drawings that are used in the following description, a characteristic portion may be conveniently illustrated in an enlarged manner for easy understanding of characteristics, and dimension ratios of respective constituent elements, and the like are not limited to be the same as actual dimension ratios and the like.

The present inventors have made a thorough investigation to solve the above-described problems. As a result, they have clarified that in order to increase the vertical orientation of multi-layered magnetic layers and increase the fineness of the magnetic particles thereof and achieve a more uniform grain sizes, it is necessary to increase the fineness of the crystal grains which form an orientation control layer and achieve a more uniform grain size thereof.

That is, as shown in FIG. 1, in an orientation control layer 11, a concavo-convex surface 11a, which makes the apex of each columnar crystal S constituting the orientation control layer 11 be convex in a dome shape, is formed, and crystal grains of a magnetic layer (or non-magnetic layer) 12 are grown in a thickness direction as columnar crystals S1 from the concavo-convex surface 11a. In addition, crystal grains of the non-magnetic layer (or magnetic layer) 13 formed on the columnar crystal S1, and a magnetic layer 14 that is the uppermost layer are epitaxially grown as columnar crystals S2 and S3 that are continuous to columnar crystals S1.

As described above, when the magnetic layers 12 to 14 are configured as a multi-layer, crystal grains constituting these respective layers 12 to 14 repeat epitaxial growth as columnar crystals S1 to S3 that are continuous until reaching the magnetic layer 14, which is the uppermost layer, from the orientation control layer 11. In addition, the layer 13 shown in FIG. 1 is a layer having a granular structure, and an oxide 15 is formed at the periphery of the columnar crystal S2 constituting the layer 13.

Accordingly, when the fineness of the crystal grains of the orientation control layer 11 is increased, and a uniform grain size thereof is achieved, the respective columnar crystals S constituting the orientation control layer 11 have a high density. Furthermore, the columnar crystals S1 to S3 of the respective layers 12 to 14, which grow in a columnar shape in a thickness direction from the apex of the respective columnar crystals S, may have a high density.

In addition, the present inventors have repeated the research on the basis of the finding. As a result, they have found the following findings. In a magnetic recording medium in which at least a soft magnetic underlying layer, a seed layer, an orientation control layer, and a vertical magnetic layer are laminated on a non-magnetic substrate in this order, when the soft magnetic underlying layer is formed from an amorphous or microcrystalline structure, and the seed layer is configured to have a structure that includes a first seed layer formed from a metal oxide or a metal nitride, and a second seed layer that is formed on the first seed layer and is formed from a metal formed with an island shape or a net shape, columnar crystals of respective layers, which are crystal-grown continuously in a thickness direction until reaching the uppermost layer of a vertical magnetic layer from an orientation control layer based on the second seed layer, may be constituted by crystal grains that have a fine and uniform grain size.

That is, in the second seed layer in the invention, crystal grains having a fine and uniform grain size are constituted by a metal formed with an island shape or a net shape, and columnar crystals, which are continuous in a thickness direction until reaching the uppermost layer of the vertical magnetic layer from the orientation control layer based on the second seed layer, are subjected to crystal growth, the columnar crystals of the respective layers may be constituted by crystal grains having a fine and uniform grain size.

According to this, in the invention, a magnetic recording medium, in which high vertical orientation of the vertical magnetic layer is maintained, and high recording densification is realized, may be provided.

Hereinafter, characteristic portions of the magnetic recording medium to which the invention is applied will be described in more detail with reference to FIG. 2.

Figure 2:
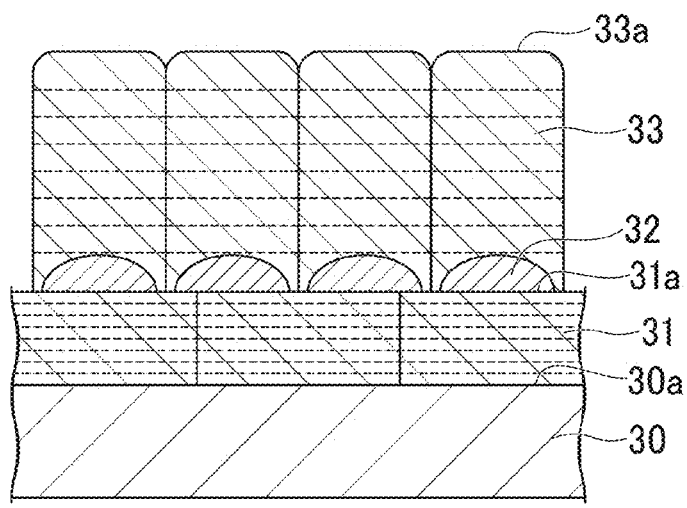
FIG. 2 is a cross-sectional diagram schematically illustrating a characteristic portion of a magnetic recording medium to which the invention is applied.

In the magnetic recording medium to which the invention is applied, as schematically shown in FIG. 2, a soft magnetic underlying layer 30 that is formed on a non-magnetic substrate (not shown) has an amorphous or microcrystalline structure, and thus smoothness in a surface 30a of the soft magnetic underlying layer 30 is increased. Accordingly, smoothness on a surface 31a of a first seed layer 31 that is formed on the soft magnetic underlying layer 30 is also increased. Furthermore, the first seed layer 31 is formed from a metal oxide or a metal nitride, and thus smoothness of the surface 31a may be increased.

In addition, in the invention, a second seed layer 32 formed from a metal formed with an island shape or a net shape is formed on the first seed layer 31. As described above, smoothness on the surface 31a of the first seed layer 31 may be increased, and thus in a metal (second seed layer 32) formed on the first seed layer 31, a nucleus occurrence probability at an early stage of growth may be made to be uniform. According to this, crystal grains constituting the second seed layer 32 become fine and uniform.

In addition, in the invention, a metal oxide or a metal nitride having small surface energy is selected for the first seed layer 31. In addition, the second seed layer 32 is formed on the first seed layer 31 by forming a metal film with a given film thickness or less as a non-continuous film in which the metal has a relatively low melting point and has an fcc structure or an hcp structure having large surface energy and therefore crystals of the metal (second seed layer 32) may be formed with an island shape or a net shape. In addition, the grain size of the metal becomes uniform.

With respect to the first seed layer 31, it is preferable to use a metal oxide or a metal nitride which contains one selected from the group consisting of CrN, TiN, AlN, ZnO, TiO, and MgO, and among these, ZnO or AlN is particularly preferably used. In addition, when forming the first seed layer 31, a sputtering method or the like may be used.

In the invention, this metal oxide or metal nitride is used, and thus surface energy of the first seed layer 31 may be made to be small and smoothness on the surface 31a may be increased. In addition, the surface of the first seed layer 31 becomes smooth. Accordingly, in the second seed layer 32 formed on the first seed layer 31, a nucleus occurrence density becomes uniform, and nuclei become fine due to a difference in surface energy with the first seed layer 31. That is, as shown in FIG. 2, with regard to crystal grains constituting the first seed layer 31 and crystal grains constituting the second seed layer 32, a nucleus occurrence density of the crystal grains constituting the second seed layer 32 may be set to be equal to or more than that of the crystal grains constituting the first seed layer 31 without limiting to one-to-one corresponding epitaxial growth.

It is preferable that the film thickness of the first seed layer be set within a range of 0.4 nm to 10 nm, more preferably 0.6 nm to 6 nm, and still more preferably 0.8 nm to 4 nm. When the film thickness of the first seed layer is set within the above-described range, surface smoothness after film formation may be increased. The reason why the surface smoothness is increased by controlling the film thickness of the first seed layer is as follows. The metal oxide or the metal nitride is an amorphous material or a crystal-growing material. However, in a case of the amorphous material, for smoothness, it is important for the film thickness to be equal to or greater than a continuous film thickness, and in a case of the crystalline material, for smoothness, it is important for the film thickness to be maintained to be both small and equal to or greater than the continuous film thickness.

With regard to the second seed layer 32, it is preferable to use a metal containing any one kind selected from a group consisting of Cu, Au, and Ag, and among these, Au or Ag is particularly preferably used. In such a metal, a c-plane has a tendency to orient, and the surface energy is large. Accordingly, fine and uniform crystals having an island shape or a net shape tend to be formed. In addition, when forming the second seed layer 32, a sputtering method or the like may be used, but it is necessary to prevent the second seed layer 32 from being a continuous film by shortening a film formation time so as to allow the second seed layer 32 to have an island shape or a net shape.

In addition, in the invention, an orientation control layer 33 is formed on the second seed layer 32. With regard to the orientation control layer 33, it is preferable to use any one kind selected from a group consisting of Ru, a Ru alloy, and a CoCr alloy, and among these, Ru is particularly preferably used. According to this, crystal grains constituting the orientation control layer 33 epitaxially grows as columnar crystals that are continuous in a thickness direction with one-to-one correspondence with the crystal grains constituting the second seed layer 32.

In addition, a dome-shaped convex portion 33a is formed at the apex of each of the columnar crystals constituting the orientation control layer 33, and thus crystal grains of a vertical magnetic layer (not shown) formed on the convex portion 33a may be epitaxially grown to be a columnar crystal that is continuous in a thickness direction with one-to-one correspondence.

It is preferable that an average particle size of the crystal grains constituting the orientation control layer 33 be 6 nm or less, and more preferably 4 nm or less. Crystal grains constituting an orientation control layer in the related art have an average grain size of approximately 7 to 9 nm. In contrast, in the invention, the average grain size of the crystal grains constituting the orientation control layer 33 may be set to 6 nm or less. According to this, in the invention, a magnetic particle density of a magnetic recording medium may be increased by two or more times, and as a result, the recording density of the magnetic recording medium may be increased by two or more times.

Figure 3:
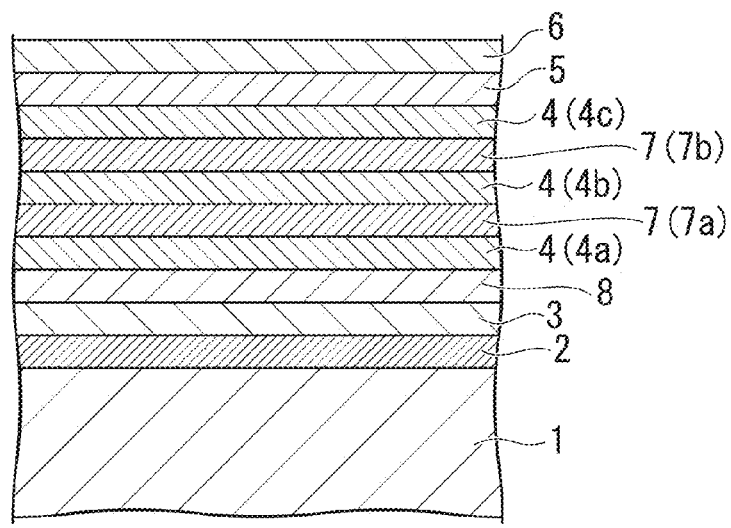
FIG. 3 is a cross-sectional diagram illustrating an example of the magnetic recording medium to which the invention is applied.

FIG. 3 shows an example of the magnetic recording medium to which the invention is applied.

As shown in FIG. 3, the magnetic recording medium has a structure in which a soft magnetic underlying layer 2, a seed layer 9, an orientation control layer 3, a vertical magnetic layer 4, a protective layer 5, and a lubricating layer 6 are sequentially laminated on a non-magnetic substrate 1.

The vertical magnetic layer 4 includes three layers of a lower magnetic layer 4a, an intermediate magnetic layer 4b, and an upper magnetic layer 4c from the non-magnetic substrate 1, and further includes a lower non-magnetic layer 7a provided between the magnetic layer 4a and the magnetic layer 4b, and an upper non-magnetic layer 7b provided between the magnetic layer 4b and the magnetic layer 4c. These magnetic layers 4a to 4c, and the non-magnetic layers 7a and 7b have an alternately laminated structure.

Furthermore, although not shown, crystal grains constituting the respective magnetic layers 4a to 4c, and the non-magnetic layers 7a and 7b form columnar crystals that are continuous in a thickness direction in combination with crystal grains constituting the orientation control layer 3.

As the non-magnetic substrate 1, a metal substrate formed from a metal material such as aluminum or an aluminum alloy may be used, or a non-metal substrate formed from a non-metal material such as glass, ceramic, silicon, silicon carbide, and carbon also may be used. In addition, a substrate, which is obtained by forming a NiP layer or a NiP alloy layer on a surface of the metal substrate or the non-metal substrate using, for example, a plating method, a sputtering method, or the like, may be used.

As the glass substrate, for example, amorphous glass, crystallized glass, or the like may be used. As the amorphous glass, for example, general-purpose soda lime glass, aluminosilicate glass, or the like may be used. In addition, as the crystallized glass, for example, lithium-based crystallized glass or the like may be used. As the ceramic substrate, for example, a sintered body containing general-purpose aluminum oxide, aluminum nitride, silicon nitride, or the like as a main component thereof, a fiber reinforced material of the sintered body, or the like may be used.

It is preferable that the non-magnetic substrate 1 have average surface roughness (Ra) of 2 nm (20 Å) or less, and preferably 1 nm or less from the viewpoint that this is suitable for high-density recording made under the condition that the flying height of the magnetic head is low. In addition, it is preferable that the microwave (Wa) on the surface be 0.3 nm or less (more preferably 0.25 nm or less) from the viewpoint that this is suitable for high-density recording made in the condition that the flying height of the head is low. In addition, it is preferable to use a substrate in which average surface roughness (Ra) of at least one of a chamfered portion and a side surface part of an end surface is 10 nm or less (more preferably 9.5 nm or less) from the viewpoint of the flying stability of the magnetic head. The microwave (Wa) may be measured as average surface roughness in a measuring range of 80 μm, for example, using a surface roughness measuring device P-12 (manufactured by KLM-Tencor Co. Ltd.).

In addition, when the non-magnetic substrate 1 comes into contact with the soft magnetic underlying layer 2 containing Co or Fe as a main component, there is a possibility of progress of corrosion due to influence of adsorbed gas and water on the surface of the substrate, diffusion of the components of the substrate, and the like. In this case, it is preferable that an adhesion layer be provided between the non-magnetic substrate 1 and the soft magnetic underlying layer 2. According to this, the corrosion may be suppressed. As a material of the adhesion layer, for example, Cr, a Cr alloy, Ti, a Ti alloy, or the like may be appropriately selected. In addition, the thickness of the adhesion layer is preferably 2 nm (30 Å) or more.

The soft magnetic underlying layer 2 is provided to increase a magnetic flux as an orthogonal component to the substrate surface in magnetic fluxes generated from the magnetic head, and also to fix the magnetization direction of the vertical magnetic layer 4 in which information is recorded to a direction orthogonal to the non-magnetic substrate 1 in a relatively firm manner. This operation becomes more significant in a case where a vertical recording single magnetic pole head is used as the recording and reproducing magnetic head.

As the soft magnetic underlying layer 2, for example, a soft magnetic material having an amorphous or microcrystalline structure containing Fe, Ni, Co, or the like may be used. Specific examples of the soft magnetic material include CoFe-based alloys (for example, CoFeTaZr, CoFeZrNb, and the like), FeCo-based alloys (for example, FeCo, FeCoV, and the like), FeNi-based alloys (for example, FeNi, FeNiMo, FeNiCr, FeNiSi, and the like), FeAl-based alloys (for example, FeAl, FeAlSi, FeAlSiCr, FeAlSiTiRu, FeAlO, and the like), FeCr-based alloys (for example, FeCr, FeCrTi, FeCrCu, and the like), FeTa-based alloys (for example, FeTa, FeTaC, FeTaN, and the like), FeMg-based alloys (for example, FeMgO and the like), FeZr-based alloys (for example, FeZrN and the like), FeC-based alloys, FeN-based alloys, FeSi-based alloys, FeP-based alloys, FeNb-based alloys, FeHf-based alloys, FeB-based alloys, and the like.

In addition to these, a Co alloy which contain 80 at % or more of Co and at least one kind of Zr, Nb, Ta, Cr, Mo, and the like, and which has an amorphous or microcrystalline structure may be used as the soft magnetic underlying layer 2. Specific preferred examples of the material include CoZr, CoZrNb, CoZrTa, CoZrCr, and CoZrMo-based alloys, and the like.

The soft magnetic underlying layer 2 is constituted by two layers of soft magnetic films, and a Ru film is preferably provided between the two layers of soft magnetic layers.

When the film thickness of the Ru film is adjusted to be within a range of 0.4 nm to 1.0 nm or 1.6 nm to 2.6 nm, the two layers of soft magnetic films have an AFC structure. When the AFC structure is employed, a so-called spike noise may be suppressed.

For the seed layer 9 and the orientation control layer 3, a layer in which the first seed layer 31, the second seed layer 32, and the orientation control layer 33 shown in FIG. 2 are laminated in this order may be employed, and thus the description thereof will not be repeated here.

In addition, a non-magnetic underlying layer 8 is preferably provided between the orientation control layer 3 and the vertical magnetic layer 4. Disturbance in crystal growth has a tendency to occur at an initial portion, which is located immediately above the orientation control layer 3, of the vertical magnetic layer 4, and this becomes a cause for noise. A disturbed portion of the initial portion is substituted with the non-magnetic underlying layer 8, and thus an occurrence of noise may be suppressed.

It is preferable that the non-magnetic underlying layer 8 be formed from a material which contains Co as a main component, and further contains an oxide. As the oxide, for example, an oxide of Cr, Si, Ta, Al, Ti, Mg, Co, or the like is preferably used. Among these, $TiO_2$, $Cr_2O_3$, $SiO_2$, or the like may be particularly suitably used. For example, the amount of the oxide is preferably 3 mol % to 18 mol % on the basis of the total amount of moles calculated by assuming an alloy of Co, Cr, Pt, or the like which constitutes magnetic particles as one compound.

In addition, the non-magnetic underlying layer 8 is preferably formed from a composite oxide in which two kinds or more of oxides are added. Among these, $Cr_2O_3$—$SiO_2$, $Cr_2O_3$—$TiO_2$, $Cr_2O_3$—$SiO_2$—$TiO_2$, or the like may be particularly suitably used. Furthermore, CoCr—$SiO_2$, CoCr—$TiO_2$, CoCr—$Cr_2O_3$—$SiO_2$, CoCr—$TiO_2$—$Cr_2O_3$, CoCr—$Cr_2O_3$—$TiO_2$—$SiO_2$, and the like may be particularly suitably used. In addition, Pt may be added from the viewpoint of crystal growth.

It is preferable that the thickness of the non-magnetic underlying layer 8 be 0.2 nm to 3 nm. When the thickness exceeds 3 nm, a decrease in Hc and Hn occurs, and thus this range is not preferable.

The magnetic layer 4a is formed from a material which contains Co as a main component, and further contains an oxide. As the oxide, for example, an oxide of Cr, Si, Ta, Al, Ti, Mg, Co, or the like is preferable used. Among these, $TiO_2$, $Cr_2O_3$, $SiO_2$, or the like may be suitably used. In addition, it is preferable that the magnetic layer 4a be formed from a composite oxide in which two or more kinds of oxide are added. Among these, $Cr_2O_3$—$SiO_2$, $Cr_2O_3$—$TiO_2$, $Cr_2O_3$—$SiO_2$—$TiO_2$, or the like may be particularly suitably used.

Figure 4:
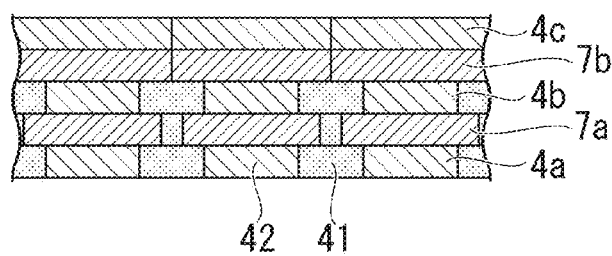
FIG. 4 is an enlarged cross-sectional diagram illustrating a laminated structure of a magnetic layer and a non-magnetic layer.

In the magnetic layer 4a, as shown in FIG. 4, it is preferable that magnetic particles 42 (crystal grains having magnetism) be dispersed in a layer including an oxide 41. In addition, it is preferable that the magnetic particles 42 have a columnar structure penetrating vertically through the magnetic layers 4a, 4b and 4c. When the structure is provided, the orientation and crystallinity of the magnetic particles 42 of the magnetic layer 4a may be satisfactory. As a result, a signal/noise ratio (S/N ratio) suitable for high-density recording may be obtained.

In order to obtain such a structure, the amount of the oxide 41 to be contained and the film forming condition of the magnetic layer 4a are important. That is, it is preferable that the amount of the oxide 41 be 3 mol % to 18 mol % on the basis of the total amount of moles calculated by assuming an alloy of Co, Cr, Pt, or the like which constitutes the magnetic particles 42 as one compound, and more preferably 6 mol % to 13 mol %.

The reason why the above-described range is preferable as the amount of the oxide 41 in the magnetic layer 4a is that when the magnetic layer 4a is formed, the oxide 41 precipitates at the periphery of the magnetic particles 42, and thus isolation and refinement of the magnetic particles 42 are possible. On the other hand, when the amount of the oxide 41 exceeds the above-described range, the oxide 41 remains in the magnetic particles 42, and thus the orientation and crystallinity of the magnetic particles 42 deteriorate. Furthermore, the oxide 41 precipitates on the top and on the bottom of the magnetic particles 42, and as a result, the columnar structure in which the magnetic particles 42 penetrate vertically through the magnetic layers 4a to 4c is not formed. Accordingly, this range is not preferable. In addition, when the amount of the oxide 41 is less than the above-described range, separation and refinement of the magnetic particles 42 are not sufficient, and as a result, noise during recording and reproduction increases, and thus a signal/noise ratio (S/N ratio) suitable for high-density recording may not be obtained. Accordingly, this range is not preferable.

It is preferable that the amount of Cr in the magnetic layer 4a be 20 at % or less (more preferably 6 at % to 16 at %). The reason why the amount of Cr is set within the above-described range is that magnetic anisotropy constant Ku of the magnetic particles 42 is not reduced too much, and high magnetization is maintained, and as a result, recording and reproducing characteristics suitable for high-density recording, and sufficient heat fluctuation characteristics may be obtained.

When the amount of Cr exceeds the above-described range, the magnetic anisotropy constant Ku of the magnetic particles 42 is reduced. Therefore, the heat fluctuation characteristics deteriorate, and the crystallinity and orientation of the magnetic particles 42 deteriorate, and as a result, the recording and reproducing characteristics deteriorate. Accordingly, this range is not preferable. In addition, when the amount of Cr is less than the above-described range, the magnetic anisotropy constant Ku of the magnetic particles 42 is higher, and thus, the vertical coercive force increases too high. Therefore, when data is recorded, satisfactory writing may not be attained using the magnetic head, and as a result, recording characteristics (OW) not suitable for high-density recording are obtained. Accordingly, this range is not preferable.

It is preferable that the amount of Pt in the magnetic layer 4a be 8 at % to 25 at %. The reason why the amount of Pt is set within the above-described range is that when the amount of Pt is less than 8 at %, the magnetic anisotropy constant Ku necessary for the vertical magnetic layer 4 decreases. On the other hand, when the amount of Pt exceeds 25 at %, a lamination defect occurs inside the magnetic particles 42, and as a result, the magnetic anisotropy constant Ku decreases. Accordingly, it is preferable that the amount of Pt be set within the above-described range in order to obtain the heat fluctuation characteristics and recording and reproducing characteristics suitable for high-density recording.

In addition, when the amount of Pt exceeds the above-described range, a layer having an fcc structure is formed in the magnetic particles 42, and thus there is a concern that the crystallinity and orientation deteriorate. Accordingly, this range is not preferable. On the other hand, when the amount of Pt is less than the above-described range, it is difficult to obtain a magnetic anisotropy constant Ku necessary in order to obtain heat fluctuation characteristics suitable for high-density recording. Accordingly, this range is not preferable.

The magnetic layer 4a may contain one or more kinds of elements selected from B, Ta, Mo, Cu, Nd, W, Nb, Sm, Tb, Ru and Re in addition to Co, Cr, Pt, and the oxide 41. When the above-described elements are contained, refinement of the magnetic particles 42 may be promoted, or crystallinity and orientation may be improved, thereby obtaining the recording and reproducing characteristics, and heat fluctuation characteristics suitable for high-density recording.

It is preferable that the total amount of the above-described elements be 8 at % or less. When the amount exceeds 8 at %, phases other than an hcp phase are formed in the magnetic particles 42. Therefore, the crystallinity and orientation of the magnetic particles 42 are disturbed, and as a result, the recording and reproducing characteristics and heat fluctuation characteristics suitable for high-density recording may not be obtained. Accordingly, this range is not preferable.

Examples of the material suitable for the magnetic layer 4a include compositions such as 90(Co14Cr18Pt)-10(SiO$_2$) {a mole concentration calculated by assuming magnetic particles, which contain Cr in an amount of 14 at %, Pt in an amount of 18 at %, and the remainder of Co, as one compound is 90 mol %, and a composition of an oxide constituted by SiO$_2$ is 10 mol %}, 92(Co10Cr16Pt)-8(SiO$_2$), 94(Co8Cr14Pt4Nb)-6(Cr$_2$O$_3$), (CoCrPt)—(Ta$_2$O$_5$), (CoCrPt)—(Cr$_2$O$_3$)—(TiO$_2$), (CoCrPt)—(Cr$_2$O$_3$)—(SiO$_2$), (CoCrPt)—(Cr$_2$O$_3$)—(SiO$_2$)—(TiO$_2$), (CoCrPtMo)—(TiO), (CoCrPtW)—(TiO$_2$), (CoCrPtB)—(Al$_2$O$_3$), (CoCrPtTaNd)—(MgO), (CoCrPtBCu)—(Y$_2$O$_3$), and (CoCrPtRu)—(SiO$_2$).

The same material as the magnetic layer 4a may be used for the magnetic layer 4b, and thus a description thereof will not be repeated here. In addition, with regard to the magnetic layer 4b, it is preferable that the magnetic particles (crystal grains having magnetism) 42 are dispersed in the layer. It is preferable that the magnetic particles 42 have a columnar structure penetrating vertically through the magnetic layers 4a, 4b and 4c as shown in FIG. 4. When this structure is formed, the orientation and crystallinity of the magnetic particles 42 of the magnetic layer 4b may be satisfactory, and as a result, a signal/noise ratio (S/N ratio) suitable for high-density recording may be obtained.

Figure 6:
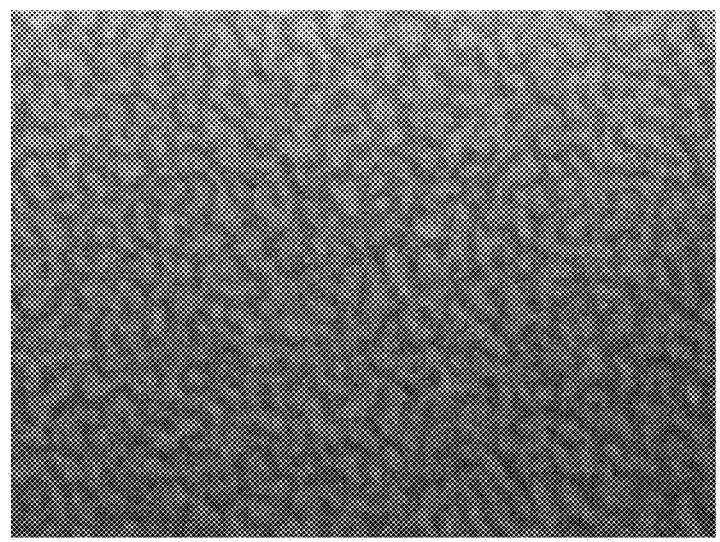
FIG. 6 is a SEM photograph obtained by photographing a sample surface of Example 1-1.

It is preferable that the magnetic layer 4c be constituted by a material which contains Co as a main component, and does not contain oxides. As shown in FIG. 6, it is preferable that the magnetic layer 4c have a structure in which magnetic particles 42 in the layer epitaxially grow in a columnar shape from the magnetic particles 42 in the magnetic layer 4a. In this case, it is preferable that the magnetic particles 42 of the magnetic layers 4a to 4c epitaxially grow in a columnar shape with one-to-one correspondence in respective layers. In addition, since the magnetic particles 42 of the magnetic layer 4b epitaxially grow from the magnetic particles 42 in the magnetic layer 4a, the fineness of the magnetic particles 42 of the magnetic layer 4b is increased, and thus crystallinity and orientation are further improved.

It is preferable that the amount of Cr in the magnetic layer 4c be 10 at % to 24 at %. When the amount of Cr is set within the above-described range, an output during reproduction of data may be sufficiently secured, and thus further satisfactory heat fluctuation characteristics may be obtained. On the other hand, when the amount of Cr exceeds the above-described range, the magnetization of the magnetic layer 4c decreases too much, and thus this range is not preferable. In addition, when the amount of Cr is less than the above-described range, separation and refinement of the magnetic particles 42 do not sufficiently occur, and noise during recording and reproduction increases, and thus a signal/noise ratio (S/N) ratio suitable for high-density recording may not be obtained. Accordingly, this range is not preferable.

In addition, the magnetic layer 4c may be formed from a material containing Pt besides Co and Cr. It is preferable that the amount of Pt in the magnetic layer 4c be 6 at % to 20 at % or less. When the amount of Pt is within the above-described range, a sufficient coercive force suitable for high-density recording may be obtained, and a high reproducing output during recording and reproduction may be maintained, and as a result, recording and reproducing characteristics and heat fluctuation characteristics suitable for high-density recording may be obtained.

On the other hand, when the amount of Pt exceeds the above-described range, a phase having an fcc structure is formed in the magnetic layer 4c, and there is a concern that the crystallinity and orientation deteriorate. Accordingly, this range is not preferable. When the amount of Pt is less than the above-described range, it is difficult to obtain a magnetic anisotropy constant Ku for obtaining heat fluctuation characteristics suitable for high-density recording, and thus this range is not preferable.

The magnetic layer 4c may include one or more kinds of elements selected from B, Ta, Mo, Cu, Nd, W, Nb, Sm, Tb, Ru, Re and Mn besides Co, Cr, and Pt. When the above-described elements are contained, refinement of the magnetic particles 42 is promoted, or crystallinity and orientation may be improved, and as a result, recording and reproducing characteristics and heat fluctuation characteristics suitable for high-density recording may be obtained.

In addition, it is preferable that the total amount of the above-described elements be 16 at % or less. On the other hand, when the amount exceeds 16 at %, phases other than the hcp phase are formed in the magnetic particles 42, and thus the crystallinity and orientation of the magnetic particles 42 are disturbed. As a result, the recording and reproducing characteristics and heat fluctuation characteristics suitable for high-density recording may not obtained, and thus this range is not preferable.

Examples of the material suitable for the magnetic layer 4c include a CoCrPt-based material, and a CoCrPtB-based material. In the case of CoCrPtB-based material, it is preferable that the total amount of Cr and B be 18 at % to 28 at %.

As a material suitable for the magnetic layer 4c, for example, in the case of CoCrPt-based material, Co14-24Cr8-22Pt (the amount of Cr is 14 at % to 24 at %, the amount of Pt is 8 at % to 22 at %, and the remainder is Co is preferable, and in the case of CoCrPtB-based material, Co10-24Cr8-22Pt0-16B (the amount of Cr is 10 at % to 24 at %, the amount of Pt is 8 at % to 22 at %, the amount of B is 0 at % to 16 at %, and the remainder is Co) is preferable. In addition to these materials, in the case of CoCrPtTa-based material, Co10-24Cr8-22Pt1-5Ta (the amount of Cr is 10 at % to 24 at %, the amount of Pt is 8 at % to 22 at %, the amount of Ta is 1 at % to 5 at %, and the remainder is Co) may be exemplified. In the case of CoCrPtTaB-based material, Co10-24Cr8-22Pt1-5Ta1-10B (the amount of Cr is 10 at % to 24 at %, the amount of Pt is 8 at % to 22 at %, the amount of Ta is 1 at % to 5 at %, the amount of B is 1 at % to 10 at %, and the remainder is Co) may be exemplified. In addition to these materials, a CoCrPtBNd-based material, a CoCrPtTaNd-based material, a CoCrPtNb-based material, a CoCrPtBW-based material, a CoCrPtMo-based material, a CoCrPtCuRu-based material, a CoCrPtRe-based material, and the like are exemplary examples.

It is preferable that the vertical coercive force (Hc) of the vertical magnetic layer 4 be set to 3,000 [Oe] or more. When the coercive force is less than 3,000 [Oe], the recording and reproducing characteristics, and particularly, frequency characteristics are inferior, and the heat fluctuation characteristics also deteriorate. Accordingly, this range is not preferable for a high-density recording medium.

It is preferable that a reverse magnetic domain nucleation magnetic field (—Hn) of the vertical magnetic layer 4 be 1,500 [Oe] or more. When the reverse magnetic domain nucleation magnetic field (—Hn) is less than 1,500 [Oe], the heat fluctuation resistance deteriorates, and thus this range is not preferable.

In the vertical magnetic layer 4, it is preferable that an average particle size of the magnetic particles be 3 nm to 12 nm. For example, the average particle size may be obtained by observing the vertical magnetic layer 4 by using a TEM (transmission electron microscope), and by image-processing the observed image.

It is preferable that the thickness of the vertical magnetic layer 4 be set to 5 nm to 20 nm. When the thickness of the vertical magnetic layer 4 is less than the above-described range, a sufficient reproducing output is not obtained, and the heat fluctuation characteristics deteriorate. When the thickness of the vertical magnetic layer 4 exceeds the above-described range, the magnetic particles in the vertical magnetic layer 4 are enlarged, thereby leading to an increase in noise during recording and reproduction. As a result, the recording and reproducing characteristics represented by a signal/noise ratio (S/N ratio) and recording characteristics (OW) deteriorate, and thus this range is not preferable.

The protective layer 5 serves to prevent the vertical magnetic layer 4 from being corroded, and also serves to prevent damages to a medium surface when the magnetic head comes into contact with the medium. As the material, materials known in the related art may be used and, for example, materials containing C, $SiO_2$, and $ZrO_2$ may be used. When the thickness of the protective layer 5 is set to 1 nm to 10 nm, the distance between the head and the medium may be made small. Accordingly, this range is preferable from the viewpoint of high-density recording.

For example, lubricants such as a perfluoropolyether, fluorinated alcohol, and fluorinated carboxylic acid are preferably used for the lubricating layer 6.

In the invention, it is preferable that the magnetic layer on the non-magnetic substrate 1 side be set as a granular magnetic layer, and the magnetic layer on the protective layer 5 side be set as a non-granular magnetic layer that does not contain oxides. According to this configuration, control and adjustment of respective characteristics such as the heat fluctuation characteristics, the recording characteristics (OW), and the S/N ratio of the magnetic recording medium may be easily performed.

In addition, in the invention, the vertical magnetic layer 4 may be constituted by four or more magnetic layers. For example, the vertical magnetic layer 4 may have a configuration in which in addition to the magnetic layers 4a and 4b, a granular magnetic layer is configured as three layers, and the magnetic layer 4c not containing oxides is provided on the granular magnetic layer, or a configuration in which the magnetic layer 4c not containing oxides is configured as a two-layer structure, and is provided on the magnetic layers 4a and 4b.

In addition, in the invention, it is preferable that a non-magnetic layer 7 (reference numerals 7a and 7b in FIG. 4) be provided between three or more magnetic layers constituting the vertical magnetic layer 4. When the non-magnetic layer 7 is provided in an appropriate thickness, magnetization inversion of an individual film becomes easy, and thus dispersion of magnetization inversion of the entirety of magnetic particles may be made small. As a result, the S/N ratio may be further improved.

As the non-magnetic layer 7 provided between the magnetic layers constituting the vertical magnetic layer 4, it is preferable to use a material having an hcp structure. Specifically, for example, Ru, a Ru alloy, a CoCr alloy, a CoCrX1 alloy (X1 represents at least one or more kinds of elements selected from Pt, Ta, Zr, Re, Ru, Cu, Nb, Ni, Mn, Ge, Si, O, N, W, Mo, Ti, V, Zr, and B), or the like may be suitably used.

In a case where a CoCr-based alloy is used as the non-magnetic layer 7 provided between the magnetic layers constituting the vertical magnetic layer 4, it is preferable that the amount of Co be within a range of 30 at % to 80 at %. This is because when the amount of Co is within this range, the coupling between the magnetic layers may be adjusted to a small level.

In addition, as the non-magnetic layer 7 provided between the magnetic layers constituting the vertical magnetic layer 4, in addition to Ru, for example, an alloy of Ru, Re, Ti, Y, Hf, or Zn may be also used may be used as an alloy having an hcp structure.

In addition, as the non-magnetic layer 7 provided between the magnetic layers constituting the vertical magnetic layer 4, metals or alloys having other structures may be used to the extent which does not deteriorate crystallinity and orientation of magnetic layers disposed above or below the non-magnetic layer 7. Specifically, for example, Pd, Pt, Cu, Ag, Au, Ir, Mo, W, Ta, Nb, V, Bi, Sn, Si, Al, C, B, Cr, and alloys thereof may be used. Particularly, as the Cr alloy, CrX2 (X2 represents at least one or more kinds of elements selected from Ti, W, Mo, Nb, Ta, Si, Al, B, C, and Zr) may be suitably used. In this case, it is preferable that the amount of Cr be set to 60 at % or more.

In addition, as the non-magnetic layer 7 provided between the magnetic layers constituting the vertical magnetic layer 4, it is preferable to use a material having a structure in which metal particles of the alloy are dispersed in an oxide, a metal nitride, or a metal carbide. Furthermore, the metal particles more preferably have a columnar structure which penetrates vertically through the non-magnetic layer 7. In order to obtain such a structure, it is preferable to use an alloy material containing an oxide, a metal nitride, or a metal carbide. Specifically, as the oxide, for example, $SiO_2$, $Al_2O_3$, $Ta_2O_5$, $Cr_2O_3$, MgO, $Y_2O_3$, $TiO_2$, or the like may be used. As the metal nitride, for example, AlN, $Si_3N_4$, TaN, CrN, or the like may be used. As the metal carbide, for example, TaC, BC, SiC, or the like may be used. Furthermore, for example, CoCr—$SiO_2$, CoCr—$TiO_2$, CoCr—$Cr_2O_3$, CoCrPt—$Ta_2O_5$, Ru—$SiO_2$, Ru—$Si_3N_4$, Pd—TaC, or the like may be used.

The oxide, the metal nitride, and the metal carbide in the non-magnetic layer 7 provided between the magnetic layers constituting the vertical magnetic layer 4 are preferably contained to the extent that does not deteriorate the crystal growth and crystal orientation of the vertical magnetic film. The amount of the oxide, the metal nitride, and the metal carbide is preferably 4 mol % to 30 mol % on the basis of the alloy.

When the amount of the oxide, the metal nitride, and the metal carbide in the non-magnetic layer 7 exceeds the above-described range, the oxide, the metal nitride, and the metal carbide remain in the metal particles, and deteriorates the crystallinity and orientation of the metal particles. Furthermore, the oxide, the metal nitride, and the metal carbide precipitate on the top and bottom of the metal particles, and thus the metal particles are not likely to form a columnar structure which vertically penetrates the non-magnetic layer 7. Therefore, there is a concern that the crystallinity and orientation of the magnetic layer formed on the non-magnetic layer 7 deteriorate. Accordingly, this range is not preferable. On the other hand, when the amount of the oxide, the metal nitride, and the metal carbide contained in the non-magnetic layer 7 is less than the above-described range, the effect due to addition of the oxide, the metal nitride, and the metal carbide may not be obtained, and thus this range is not preferable.

Figure 5:
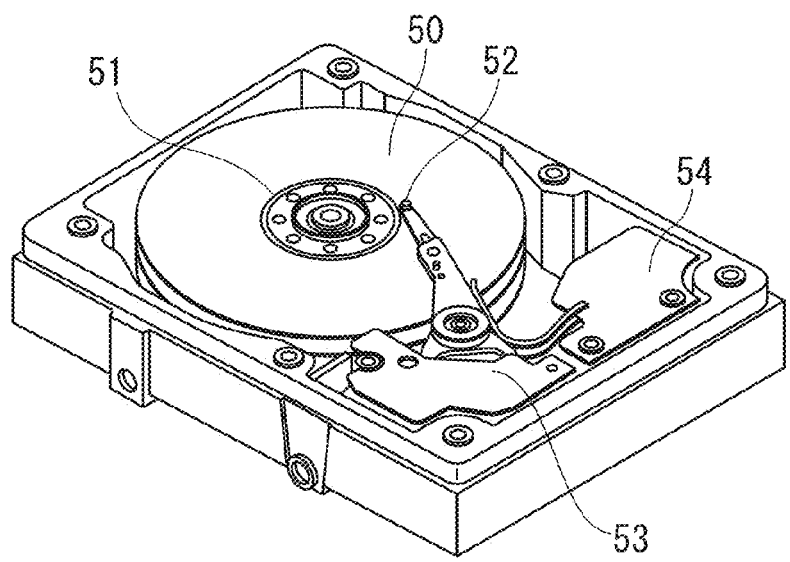
FIG. 5 is a perspective diagram illustrating an example of a magnetic recording and reproducing device.

FIG. 5 shows an example of the magnetic recording and reproducing device to which the invention is applied.

The magnetic recording and reproducing device includes a magnetic recording medium 50 having a configuration shown in FIG. 3, a medium drive unit 51 that rotates the magnetic recording medium 50, a magnetic head 52 that records and reproduces information in and from the magnetic recording medium 50, a head drive unit 53 that allows the magnetic head 52 to relatively move with respect to the magnetic recording medium 50, and a recording and reproducing signal processing system 54. In addition, the recording and reproducing signal processing system 54 processes data input from the outside and transmits a recording signal to the magnetic head 52. In addition, the recording and reproducing signal processing system 54 processes a reproducing signal transmitted from the magnetic head 52, and may transmit data to the outside. In addition, as the magnetic head 52 used in the magnetic recording and reproducing device to which the invention is applied, a magnetic head, which is provided with a GMR element using a giant magnetoresistive effect (GMR) or the like as a reproducing element, and which is suitable for high recording densification, may be used.

EXAMPLES

Hereinafter, the effect of the invention will be made more clear by examples. In addition, the invention is not limited to the following examples, and may be appropriately modified within a range not changing the gist of the invention.

Example 1

In Example 1, first, a washed glass substrate (manufactured by Konica Minolta Co., Ltd., outer diameter: 2.5 inches) was put in a film-forming chamber of a DC magnetron sputtering apparatus (C-3040, manufactured by Anerva Corporation), and the film-forming chamber was evacuated until the ultimate degree of vacuum reached $1 \times 10^5$ Pa. Then, an adhesion layer having a thickness of 10 nm was formed on the glass substrate using a Cr target. In addition, a soft magnetic layer having a thickness of 25 nm was formed on the adhesion layer using a target of Co-20Fe-5Zr-5Ta (the amount of Fe is 20 at %, the amount of Zr is 5 at %, the amount of Ta is 5 at %, and the remainder is Co) at a substrate temperature of 100° C. or lower. A Ru layer was formed on the soft magnetic layer in a thickness of 0.7 nm. Then, a soft magnetic layer having a layer thickness of 25 nm was formed using a target of Co-20Fe-5Zr-5Ta. The soft magnetic layer was set as a soft magnetic underlying layer.

Next, a first seed layer having a layer thickness of 20 nm was formed on the soft magnetic underlying layer using a ZnO target, and a second seed layer was formed on a surface of the first seed layer using an Au target. At this time, samples in which the thickness of the second seed layer was set to 0.5 nm (Example 1-1), 1 nm (Example 1-2), and 1.5 nm (Comparative Example 1-1) were prepared. In addition, a sample (Comparative Example 1-2) in which Au was not formed on a surface of ZnO was also prepared for comparison.

Figure 7:
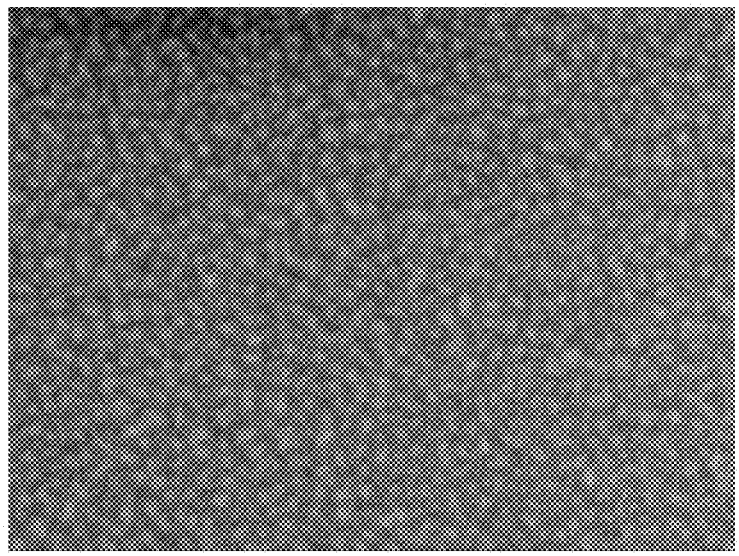
FIG. 7 is a SEM photograph obtained by photographing a sample surface of Example 1-2.
Figure 8:
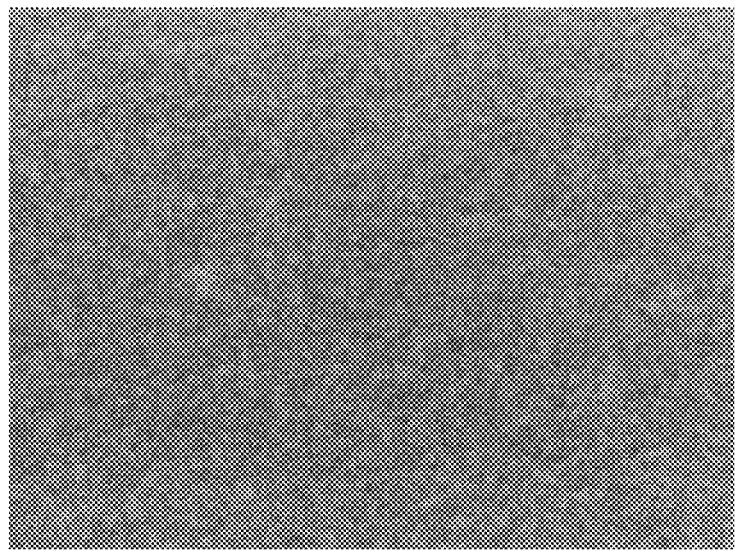
FIG. 8 is a SEM photograph obtained by photographing a sample surface of Comparative Example 1-2.

In addition, the surface of the respective samples of Examples 1-1 and 1-2, and Comparative Example 1-1 and 1-2 was observed using a SEM. Form the observation, it could be found that in Comparative Example 1-2, a continuous film of ZnO was formed, and in Example 1-1, Au crystals were grown on the surface of ZnO in an island shape. On the other hand, it could be found that in Example 1-2, Au crystals were grown on the surface of ZnO in a net shape. On the other hand, in Comparative Example 1-1, Au was grown the surface of ZnO as a continuous film. In addition, SEM photographs of respective surfaces of Example 1-2, Example 1-1, and Comparative Example 1-2 are shown in FIG. 6, FIG. 7, and FIG. 8, respectively.

Example 2

In Example 2, magnetic recording media were actually prepared using respective samples of Examples 1-1 and 1-2, and Comparative Examples 1-1 and 1-2 which were prepared in Example 1, and the respective magnetic recording media that were prepared were set as Examples 2-1 and 2-2, and Comparative Examples 2-1 and 2-2.

When preparing each of the magnetic recording media, an orientation control layer having a layer thickness of 20 nm was formed on each sample using a Ru target. In addition, when forming the orientation control layer, Ru having a layer thickness of 10 nm was formed at a sputtering pressure of 0.8 Pa, and then Ru having a layer thickness of 10 nm was formed at a sputtering pressure of 1.5 Pa.

Next, a magnetic layer having a layer thickness of 9 nm was formed on the orientation control layer using a target of 91(Co15Cr16Pt)-6($SiO_2$)-3($TiO_2$) (91 mol % of alloy in which the amount of Cr was 15 at %, the amount of Pt was 18 at %, and the remainder was Co, 6 mol % of oxide formed from $SiO_2$, and 3 mol % of oxide formed from $TiO_2$). In addition, the sputtering pressure at this time was set to 2 Pa.

Next, a non-magnetic layer having a layer thickness of 0.3 nm was formed on the magnetic layer using a target of 88(Co30Cr)-12($TiO_2$) (88 mol % of alloy in which the amount of Cr was 30 at % and the remainder was Co, and 12 mol % of oxide formed from $TiO_2$).

Next, a magnetic layer having a layer thickness of 6 nm was formed on the non-magnetic layer using a target of 92(Co11Cr18Pt)-5($SiO_2$)-3($TiO_2$) (92 mol % of alloy in which the amount of Cr was 11 at %, the amount of Pt was 18e/0, and the remainder was Co, 5 mol % of oxide formed from $SiO_2$, and 3 mol % of oxide formed from $TiO_2$). In addition, the sputtering pressure at this time was set to 2 Pa.

Next, a non-magnetic layer having a layer thickness of 0.3 nm was formed on the magnetic layer using a Ru target.

Next, a magnetic layer having a layer thickness of 7 nm was formed on the non-magnetic layer using a target of Co20Cr14Pt3B (the amount of Cr was 20 at %, the amount of Pt was 14 at %, the amount of B was 3 at %, and the remainder was Co). In addition, the sputtering pressure at this time was set to 0.6 Pa.

Next, a protective layer having a layer thickness of 3.0 nm was formed on the magnetic layer by a CVD method. Next, a lubricating film formed from perfluoropolyether was formed using a dipping method, whereby the respective magnetic recording media of Examples 2-1 and 2-2, and Comparative Examples 2-1 and 2-2 were obtained.

In addition, with respect to the respective magnetic recording media of Examples 2-1 and 2-2, and Comparative Examples 2-1 and 2-2, coercive force dispersion "ΔHc/Hc" "SNR (dB)", over-write characteristics "OW (dB)", and bit error rate "BER" were measured. The measured results are shown in Table 1. In addition, the bit error rate was calculated by "−log(the number of error bits/the number of total bits)".

In addition, with respect to the magnetic recording media, samples in which the magnetic layer of Co20Cr14Pt3B was not formed were prepared, respectively, to make evaluation of an average particle size of magnetic particles easy, and planar TEM observation of the magnetic layer, which had a granular structure, of the sample was performed to measure an average particle size <D>, and particle size distribution σ/<D> standardized by the average particle size. Results are shown in Table 1.

TABLE 1

|  | ΔHc/Hc | SNR (dB) | OW (dB) | BER | <D> (nm) | σ/<D> |
|---|---|---|---|---|---|---|
| Example 2-1 | 0.104 | 19.38 | 35.1 | 4.09 | 5.6 | 13.2 |
| Example 2-2 | 0.097 | 19.21 | 32.5 | 4.00 | 5.1 | 12.5 |
| Comparative Example 2-1 | 0.112 | 18.81 | 29.0 | 3.80 | 6.5 | 15.8 |
| Comparative Example 2-2 | 0.150 | 18.23 | 27.9 | 3.30 | 7.3 | 19.0 |

As shown in Table 1, it can be seen that in the magnetic recording media of Example 2-1 and 2-2, the magnetic layer was constituted by crystal grains having a fine and uniform particle size, and thus the magnetic recording media of Example 2-1 and 2-2 exhibit electromagnetic conversion characteristics that are more excellent than that of the magnetic recording media of Comparative Examples 2-1 and 2-2.

Example 3

In Example 3, the same magnetic recording media as Example 2-2 were prepared under the same conditions as Example 2-2 except that the first seed layer, the second seed layer, and the orientation control layer were changed as shown in Table 2, and these media were set as Examples 3-1 to 3-9.

In addition, with respect to the respective magnetic recording media of Examples 3-1 to 3-9, coercive force dispersion "ΔHc/Hc", "SNR (dB)", over-write characteristics "OW (dB)", and bit error rate "BER" were measured. The measured results are shown in Table 2.

TABLE 2

|  | First seed layer | Second seed layer | Orientation control layer | ΔHc/Hc | SNR (dB) | OW (dB) | BER |
|---|---|---|---|---|---|---|---|
| Example 2-2 | ZnO | Au | Ru | 0.097 | 19.21 | 32.5 | 4.00 |
| Example 3-1 | CrN | Au | Ru | 0.110 | 18.90 | 30.2 | 3.89 |
| Example 3-2 | TiN | Au | Ru | 0.092 | 18.96 | 29.2 | 3.86 |
| Example 3-3 | AlN | Au | Ru | 0.099 | 19.10 | 29.6 | 3.92 |
| Example 3-4 | TiO | Au | Ru | 0.101 | 18.92 | 29.2 | 3.88 |
| Example 3-5 | MgO | Au | Ru | 0.105 | 18.95 | 30.2 | 3.86 |
| Example 3-6 | ZnO | Cu | Ru | 0.090 | 19.00 | 29.8 | 3.90 |
| Example 3-7 | ZnO | Ag | Ru | 0.087 | 19.15 | 29.2 | 3.95 |
| Example 3-8 | ZnO | Au | 90Ru10Co | 0.092 | 19.17 | 29.5 | 3.95 |
| Example 3-9 | ZnO | Au | 70Co30Cr | 0.093 | 19.05 | 30.0 | 3.88 |

As shown in Table 2, it can be seen that similarly to the magnetic recording media of Examples 2-1 and 2-2, the magnetic recording medium of Examples 3-1 to 3-9 electromagnetic conversion characteristics that are more excellent than that of the magnetic recording media of Comparative Examples 2-1 and 2-2.

Example 4

In Example 4, magnetic recording media were prepared under the same conditions as Example 2-2 except that the film thickness of the first seed layer in the magnetic recording medium of Example 2-2 was changed as shown in Table 3. With respect to the magnetic recording media that were prepared, coercive force dispersion "ΔHc/Hc", "SNR (dB)", over-write characteristics "OW (dB)", and bit error rate "BER" were measured. The measured results are shown in Table 3.

TABLE 3

| | Thickness of first seed layer (nm) | ΔHc/Hc | SNR (dB) | OW (dB) | BER |
|---|---|---|---|---|---|
| Example 2-2 | 20 | 0.097 | 19.21 | 32.5 | 4 |
| Example 4-1 | 15 | 0.093 | 19.8 | 32.5 | 4.21 |
| Example 4-2 | 10 | 0.8 | 20.4 | 33.3 | 4.42 |
| Example 4-3 | 5 | 0.065 | 21.2 | 33.7 | 4.45 |
| Example 4-4 | 3 | 0.054 | 21.7 | 34 | 4.59 |
| Example 4-5 | 1 | 0.055 | 21.5 | 34.4 | 4.55 |
| Example 4-6 | 0.4 | 0.058 | 20.9 | 33.9 | 4.48 |
| Example 4-7 | 0.2 | 0.068 | 20.4 | 31.9 | 4.32 |

As shown in Table 3, the electromagnetic conversion characteristics varied by changing the film thickness of the first seed layer. It can be seen that among the magnetic recording media, the magnetic recording media of Examples 4-2 to 4-6 exhibit particularly excellent electromagnetic conversion characteristics.

INDUSTRIAL APPLICABILITY

According to the invention, columnar crystals of respective layers, which are crystal-grown continuously in a thickness direction until reaching the uppermost layer of a vertical magnetic layer from an orientation control layer based on the second seed layer, may be constituted by crystal grains having a fine and uniform grain size. According to this, a magnetic recording medium in which high vertical orientation of a vertical magnetic layer is maintained, and high recording densification is realized, a method of manufacturing the same, and a magnetic recording and reproducing device provided with the magnetic recording medium may be provided. Accordingly, the invention may be suitably used for a magnetic recording medium, a method of manufacturing the same, and a magnetic recording and reproducing device provided with the magnetic recording medium.

REFERENCE SIGNS LIST

1: Non-magnetic substrate
2: Soft magnetic underlying layer
3: Orientation control layer
4: Vertical magnetic layer
4a: Lower magnetic layer
4b: Intermediate magnetic layer
4c: Upper magnetic layer
5: Protective layer
6: Lubricating layer
7: Non-magnetic layer
7a: Lower non-magnetic layer
7b: Upper non-magnetic layer
8: Non-magnetic underlying layer
9: Seed layer
11: Orientation control layer
11a: Concavo-convex surface
12 to 14: magnetic layer or non-magnetic layer
S, S1 to S3: Columnar crystal
30: Soft magnetic underlying layer
31: First seed layer
32: Second seed layer
33: Orientation control layer
50: Magnetic recording medium
51: Medium drive unit
52: Magnetic head
53: Head drive unit
54: Recording and reproducing signal processing system

The invention claimed is:

1. A magnetic recording medium having at least a configuration in which a soft magnetic underlying layer, a seed layer, an orientation control layer, and a vertical magnetic layer are laminated on a non-magnetic substrate in this order,
wherein the soft magnetic underlying layer has an amorphous or microcrystalline structure,
the seed layer includes a first seed layer formed from a metal oxide or a metal nitride, and a second seed layer which is formed on the first seed layer and is formed from a metal formed with an island-shape or a net shape, wherein
the first seed layer contains any one selected from the group consisting of CrN, TiN, AlN, ZnO, TiO and MgO,
the second seed layer contains any one selected from the group consisting of Cu, Au and Ag,
in the orientation control layer and the vertical magnetic layer, respective crystal grains constitute columnar crystals that are continuous in a thickness direction based on the second seed layer, and
the vertical magnetic layer comprises a layer which contains Co as a main component and further contains at least one oxide selected from the group consisting of oxides of Cr, Si, Ta, Al, Ti, Mg and Co.

2. The magnetic recording medium according to claim 1, wherein the first seed layer contains ZnO or AN.

3. The magnetic recording medium according to claim 1, wherein the film thickness of the first seed layer is within a range of 0.4 nm to 10 nm.

4. The magnetic recording medium according to claim 1, wherein the second seed layer contains Au or Ag.

5. The magnetic recording medium according to claim 1, wherein the orientation control layer contains any one kind selected from a group consisting of Ru, a Ru alloy, and a CoCr alloy.

6. The magnetic recording medium according to claim 5, wherein the orientation control layer contains Ru.

7. A method of manufacturing a magnetic recording medium having at least a configuration in which a soft magnetic underlying layer, a seed layer, an orientation control layer, and a vertical magnetic layer are laminated on a non-magnetic substrate in this order,
wherein the soft magnetic underlying layer is made to have an amorphous or microcrystalline structure,
the seed layer is made to have a structure that includes a first seed layer formed from a metal oxide or a metal nitride, and a second seed layer which is formed on the first seed layer and is formed from a metal formed with an island-shape or a net shape, wherein the first seed layer contains any one selected from the group consisting of CrN, TiN, AlN, ZnO, TiO and MgO, and the second seed layer contains any one selected from the group consisting of Cu, Au and Ag, and the respective layers are subjected to crystal growth in such a manner that crystal grains constituting the orientation control layer and the vertical magnetic layer form columnar crystals that are continuous in a thickness direction based on the second seed layer, wherein the vertical magnetic layer comprises a layer which contains Co as a main component and further contains at least one oxide selected from a group consisting of oxides of Cr, Si, Ta, Al, Ti, Mg and Co.

8. A magnetic recording and reproducing device, comprising:

the magnetic recording medium according to claim 1, or the magnetic recording medium that is manufactured by the manufacturing method according to claim 7; and a magnetic head that performs recording and reproduction of information with respect to the magnetic recording medium.

* * * * *